United States Patent
Ke et al.

(10) Patent No.: US 9,736,866 B2
(45) Date of Patent: Aug. 15, 2017

(54) METHOD OF IMPLEMENTING FAST RECOVERY OF PUBLIC WARNING SYSTEMS

(71) Applicant: Samsung Electronics Co., Ltd., Suwon-si, Gyeonggi-do (KR)

(72) Inventors: Xiaowan Ke, Beijing (CN); Lixiang Xu, Beijing (CN); Hong Wang, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 188 days.

(21) Appl. No.: 14/632,386

(22) Filed: Feb. 26, 2015

(65) Prior Publication Data
US 2015/0250006 A1    Sep. 3, 2015

(30) Foreign Application Priority Data
Feb. 28, 2014 (CN) .......................... 2014 1 0073429

(51) Int. Cl.
H04W 4/00 (2009.01)
H04W 76/00 (2009.01)
H04W 24/02 (2009.01)

(52) U.S. Cl.
CPC ......... *H04W 76/007* (2013.01); *H04W 24/02* (2013.01)

(58) Field of Classification Search
CPC ........................... H04W 76/007; H04W 24/02
USPC ........ 370/329, 216–228, 242–245, 248, 250, 370/254–258, 453, 457
See application file for complete search history.

(56) References Cited

U.S. PATENT DOCUMENTS

| | | | | |
|---|---|---|---|---|
| 8,565,689 B1* | 10/2013 | Rubin | ..................... | G06F 11/00 370/232 |
| 9,392,634 B2* | 7/2016 | Ronneke | ............. | H04W 76/028 |
| 2009/0124259 A1* | 5/2009 | Attar | ....................... | H04L 47/10 455/436 |
| 2010/0267388 A1* | 10/2010 | Olsson | .................. | H04W 36/38 455/436 |
| 2010/0312846 A1* | 12/2010 | Lu | ......................... | H04W 68/00 709/206 |
| 2011/0117876 A1 | 5/2011 | Xu et al. | | |

(Continued)

FOREIGN PATENT DOCUMENTS

KR    10-2011-0026464 A    3/2011

OTHER PUBLICATIONS

Ericsson, "Discussion Paper Answering the LS from CT4", R3-140332, 3GPP TS G-RAN WG3#83, Feb. 10-14, 2014, Prague, Czech Republic.

*Primary Examiner* — Thai Hoang
(74) *Attorney, Agent, or Firm* — Jefferson IP Law, LLP

(57) ABSTRACT

A method of implementing fast recovery of public warning systems (PWSs) is provided. The method includes receiving, by a mobility management entity (MME), a first restart indication message transmitted by a home evolved nodeB (HeNB) gateway (GW), transmitting, by the MME, a second restart indication message to a cell broadcast center (CBC), the second message including an index of the HeNB and/or an index of the HeNB GW, receiving, by the MME, a warning request transmitted by the CBC, the warning request including the index of the HeNB and/or the index of the HeNB GW, and transmitting, by the MME, the warning request which is destined for the HeNB to the HeNB GW.

16 Claims, 13 Drawing Sheets

(56) References Cited

U.S. PATENT DOCUMENTS

| | | | |
|---|---|---|---|
| 2012/0106423 A1* | 5/2012 | Nylander | H04W 52/0241 370/311 |
| 2012/0129483 A1 | 5/2012 | Wang et al. | |
| 2012/0202496 A1* | 8/2012 | Okabe | H04W 76/045 455/435.1 |
| 2013/0155954 A1 | 6/2013 | Wang et al. | |
| 2013/0322390 A1* | 12/2013 | Xu | H04W 76/02 370/329 |
| 2013/0344880 A1* | 12/2013 | Tamura | H04W 72/0433 455/450 |
| 2014/0016614 A1* | 1/2014 | Velev | H04W 4/005 370/331 |
| 2014/0018031 A1 | 1/2014 | Ode | |
| 2014/0177434 A1* | 6/2014 | Cartmell | H04L 41/0668 370/221 |
| 2014/0334449 A1* | 11/2014 | Rubin | H04W 36/165 370/331 |

\* cited by examiner

METHOD OF IMPLEMENTING FAST RECOVERY OF PUBLIC WARNING SYSTEMS

CROSS-REFERENCE TO RELATED APPLICATION(S)

This application claims the benefit under 35 U.S.C. §119 (a) of a Chinese patent application filed on Feb. 28, 2014 in the State Intellectual Property Office and assigned Serial number 201410073429.3, the entire disclosure of which is hereby incorporated by reference.

TECHNICAL FIELD

The present disclosure relates to wireless communications. More particularly, the present disclosure relates to a method of implementing fast recovery of public warning systems (PWSs).

BACKGROUND

Public warning systems (PWSs) are mainly for forecasting events, e.g., earthquakes, hurricanes, and the like, to the public by distributing warning messages. PWSs transmit to base stations warning messages, warning areas, and conditions of transmitting the warning messages to make the base stations schedule and broadcast the warning messages in the warning areas specified by the PWSs.

FIG. 1 is a schematic diagram illustrating a method of implementing fast recovery of PWSs according to the related art.

Referring to FIG. 1, an evolved nodeB (eNB) 101 schedules and broadcasts warning messages from a cell broadcast center (CBC) 105. The warning messages are transmitted by the CBC 105 to base stations via a mobility management entity (MME) 104. A home evolved nodeB (HeNB) 102 is connected to a core network directly or via an HeNB gateway (GW). When the HeNB 102 is connected to the core network via an HeNB GW 103, the MME 104 transmits warning requests transmitted by the CBC 105 to the HeNB GW 103 connected to the HeNB 102, and the HeNB GW forwards the warning requests to the HeNB 102. The process of the HeNB 102 handling the warning messages is similar to that of the eNB 101. The HeNB GW 103 forwards messages from the core network to the HeNB 102, and transmits messages from the HeNB 102 to the core network. The MME 104 maintains mobility context, session context and security information of UEs, routes messages from the CBC 105 in the PWS to base stations specified in the messages, and routes messages from the base stations to the CBC 105. The CBC 105 maintains configurations of warning messages in the PWS, e.g., configurations regarding warning contents, warning areas, warning conditions, and the like, and selects an MME based on the warning areas to transmit messages to the base stations.

Since a base station or some or all cells of the base station may fail and restart, or the PWS service in some or all cells of base station is restarted, the CBC needs to obtain information of the restated cell(s) or of the restarted base station or the cell(s) or the base station where the PWS service is restarted to avoid warning messages being lost. The affected warning messages due to the restarted cell(s) or of the restated base station or restarted PWS service may be recovered by the CBC. The CBC may reload the warning messages to the restarted base station or the base station of the restarted cell(s) via the MME and inform the MME of the identity of the base station so that the MME can forward the warning messages to the specified base station based on the identity of the base station.

At present, the following difficulties are met with by an MME routing warning requests to base stations: when the base station is an HeNB and connects to the core network via an HeNB GW, the MME only knows the identity of the HeNB GW rather than the identity of the HeNB, thus it cannot identify the HeNB or the HeNB GW connected by the HeNB according to an index of the HeNB in the receiving a warning request.

Therefore, a need exists for a method of implementing fast recovery of PWSs.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method of implementing fast recovery of public warning systems (PWSs).

In accordance with an aspect of the present disclosure, a method for implementing fast recovery of PWSs is provided. The method includes receiving, by a mobility management entity (MME), a first restart indication message transmitted by a home evolved nodeB gateway (HeNB GW), transmitting, by the MME, a second restart indication message to a cell broadcast center (CBC), the second message including an index of the HeNB and/or an index of the HeNB GW, receiving, by the MME, a warning request transmitted by the CBC, the warning request including the index of the HeNB and/or the index of the HeNB GW, and transmitting, by the MME, the warning request which is destined for the HeNB to the HeNB GW.

In an embodiment of the present disclosure, the index of the HeNB is an identity of the HeNB or a tracking area identity (TAI) supported by the HeNB and the index of the HeNB GW is an identity of the HeNB GW or a TAI supported by the HeNB GW.

In an embodiment of the present disclosure, the procedure of the MME transmitting the second restart indication message may include adding, by the MME, the index of the HeNB GW into the first restart indication message or replacing the index of the HeNB in the first restart indication message with the index of the HeNB GW, and transmitting the modified first restart indication message to the CBC as the second restart indication message.

In an embodiment of the present disclosure, the first restart indication message received by the MME from the HeNB GW may include the identity of the HeNB or the TAI supported by the HeNB, and the MME may store a relation which associates the HeNB with the HeNB GW.

In an embodiment of the present disclosure, the warning request received by the MME from the CBC may include the identity of the HeNB or the TAI supported by the HeNB, and the MME transmits the warning request to the HeNB GW corresponding to the HeNB based on the relation which associates the HeNB with the HeNB GW.

In an embodiment of the present disclosure, the warning request transmitted by the MME to the HeNB GW may include the index of the HeNB, and the HeNB GW may transmit the warning request to the HeNB identified by the index.

In accordance with another aspect of the present disclosure, a method of implementing fast recovery of PWSs is provided. The method includes transmitting, by an HeNB GW, an HeNB restart indication to an MME, the HeNB restart indication including an index of the HeNB and/or an index of the HeNB GW, receiving, by the HeNB GW, a warning request transmitted by the MME, and transmitting, by the HeNB GW, the warning request to the HeNB.

In an embodiment of the present disclosure, the index of the HeNB is an identity of the HeNB or a TAI supported by the HeNB and the index of the HeNB GW is an identity of the HeNB GW or a TAI supported by the HeNB GW.

In an embodiment of the present disclosure, the procedure of the HeNB GW transmitting an HeNB restart indication may include generating, by the HeNB GW, the HeNB restart indication based on a re-established S1 interface between the HeNB and the HeNB GW and transmitting the HeNB restart indication to the MME, or transmitting, by the HeNB GW, the HeNB restart indication to the MME after receiving a restart indication from the HeNB.

In an embodiment of the present disclosure, the procedure of the HeNB GW transmitting an HeNB restart indication may include adding, by the HeNB GW, an index of the HeNB GW into a restart indication transmitted by the HeNB, or replacing an index of the HeNB in the restart indication transmitted by the HeNB with the index of the HeNB GW, and transmitting the modified restart indication to the MME as the HeNB restart indication.

In an embodiment of the present disclosure, the warning request received by the HeNB GW from the MME may include an index of the HeNB, and the HeNB GW transmits the warning request to the HeNB identified by the index of the HeNB.

In accordance with another aspect of the present disclosure, a method of implementing fast recovery of PWSs is provided. The method includes transmitting, by an HeNB, a first restart indication to an HeNB GW, the first restart indication including an index of the HeNB and/or an index of the HeNB GW, transmitting, by the HeNB GW, a second restart indication to an MME, the second restart indication including the index of the HeNB and/or the index of the HeNB GW, transmitting, by the MME, a third restart indication to a CBC, the third restart indication including the index of the HeNB and/or the index of the HeNB GW, transmitting, by the CBC, a first warning request to the MME, the first warning request including the index of the HeNB and/or the index of the HeNB GW, transmitting, by the MME, a second warning request to the HeNB GW, and transmitting, by the HeNB GW, a third warning request to the HeNB.

In an embodiment of the present disclosure, if the restart indication transmitted by the HeNB includes the index of the HeNB GW, the index of the HeNB GW is transmitted to the CBC via the HeNB GW and the MME.

In an embodiment of the present disclosure, if the restart indication received by the HeNB GW includes the index of the HeNB, the first restart indication transmitted by the HeNB GW to the MME includes the index of the HeNB GW.

In an embodiment of the present disclosure, if the first restart indication received by the MME includes the index of the HeNB, the second restart indication transmitted by the MME to the CBC includes the index of the HeNB GW.

In an embodiment of the present disclosure, if the second restart indication received by the MME includes the index of the HeNB, the MME may store a relation which associates the HeNB with the HeNB GW, and the index of the HeNB is included in the third restart indication transmitted by the MME to the CBC.

In an embodiment of the present disclosure, the index of the HeNB is an identity of the HeNB or a TAI supported by the HeNB and the index of the HeNB GW is an identity of the HeNB GW or a TAI supported by the HeNB GW.

It can be seen from the above technical mechanism that the method is applicable to situations where a core network transmits warning requests to a specified base station, and particularly applicable to a situation where base stations accesses the core network via gateways. The various embodiments of the present disclosure provide multiple solutions for routing downlink signaling of warning messages that can satisfy demands of communications services designed for public security purposes.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Figure 1:
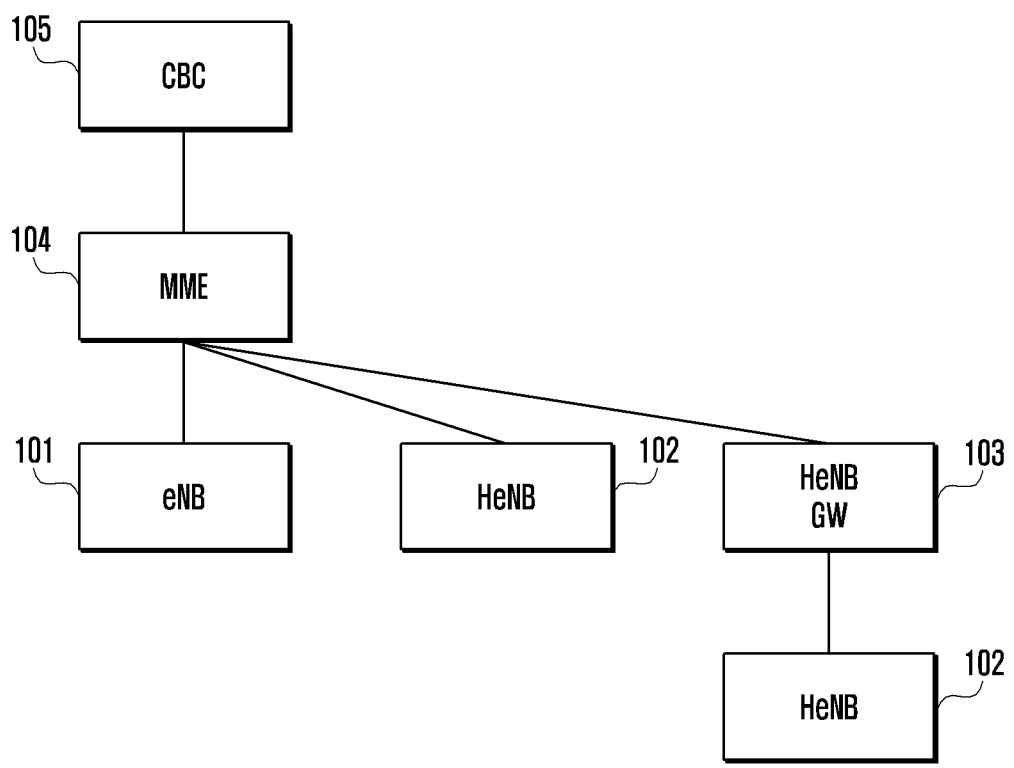
FIG. 1 is a schematic diagram illustrating a method of implementing fast recovery of public warning systems (PWSs) according to the related art.
Figure 2:
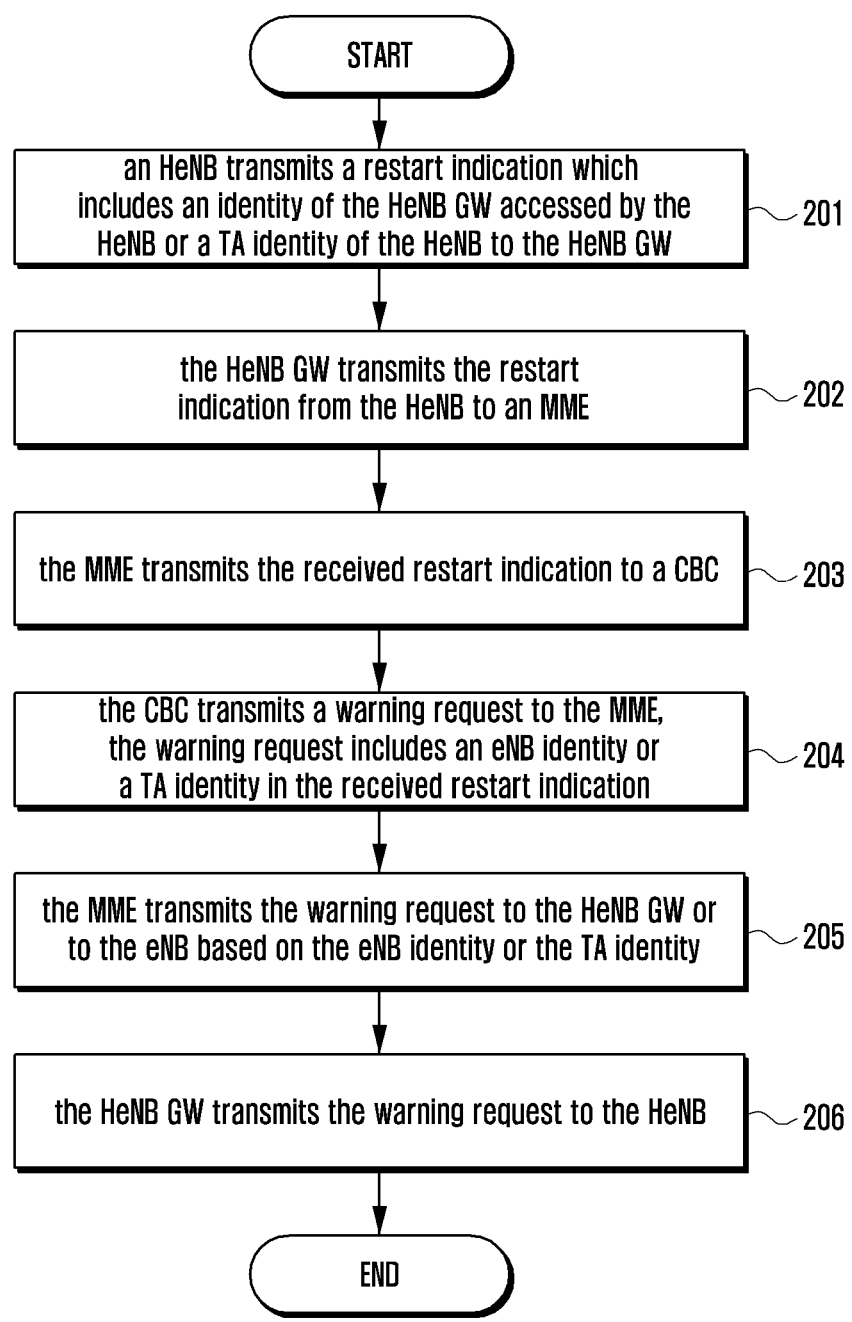
FIG. 2 is a flowchart illustrating a method of implementing fast recovery of PWSs according to an embodiment of the present disclosure.

FIG. 2 is a flowchart illustrating a method of implementing fast recovery of public warning systems (PWSs) according to an embodiment of the present disclosure.

Referring to FIG. 2, at operation 201, a home evolved nodeB (HeNB) transmits a restart indication (e.g., a PWS Restart Indication) to an HeNB GW. The PWS Restart Indication includes an identity of the HeNB GW connected by the HeNB or a tracking area identity (TAI) supported by the HeNB GW.

The PWS Restart Indication may include an eNB identity. When the HeNB is connected to the mobility management entity (MME) via the HeNB GW, the HeNB sets the eNB identity to be the identity of the HeNB GW connected to the HeNB.

At operation 202, the HeNB GW transmits the PWS Restart Indication from the HeNB to the MME.

At operation 203, the MME transmits the received PWS Restart Indication to a cell broadcast center (CBC).

At operation 204, after receiving the PWS Restart Indication, the CBC decides to recover a warning message destined for the restarting cell or base station. The CBC transmits a warning request (e.g., a write-replace warning request) to the MME. The write-replace warning request may include an eNB identity or a TAI in the received PWS Restart Indication to instruct the MME to transmit the write-replace warning request to a base station identified by the eNB identity or the TAI. When the HeNB accesses the MME via the HeNB GW, the eNB identity is the identity of the HeNB GW connected by the HeNB.

At operation 205, the MME receives a write-replace warning request transmitted by the CBC. The write-replace warning request includes an eNB identity or a TAI. The MME transmits the write-replace warning request to an HeNB GW or an eNB based on the eNB identity or the TAI. When the HeNB accesses the MME via the HeNB GW, the eNB identity is the identity of the HeNB GW connected by the HeNB. The MME may identify the HeNB by using the identity of the HeNB GW.

At operation 206, after receiving the write-replace warning request, the HeNB GW transmits the write-replace warning request to an HeNB corresponding to the write-replace warning request.

The HeNB GW can identify the HeNB that is to receive the write-replace warning request by using three manners.

The HeNB GW may identify a warning area in the warning request, and transmits the warning request to an HeNB serving the warning area. For example, if the warning area is an evolved universal mobile telecommunications system (E-UTRAN) cell global identifier (ECGI), the HeNB GW may identify the HeNB by using the ECGI. If the warning area is a TAI, the HeNB GW may identify the HeNB based on the TAI. Alternatively, the HeNB GW may identify the HeNB based on an emergency area.

Alternatively, after receiving the warning request, the HeNB GW may transmit the warning request to all HeNBs connected to the HeNB GW, and each of the HeNBs may decide whether to accept the warning request and transmit the warning request within its cells according to whether the HeNB belongs to the warning area.

Alternatively, the MME may include the index of the HeNB (e.g., the identity of the HeNB or the TAI supported by the HeNB) in the warning request transmitted to the HeNB GW, to assist the HeNB GW to identify the HeNB and transmit the warning request to the identified HeNB. The MME may adopt the following manners to obtain the index of the HeNB.

According to manner one, the HeNB or the HeNB GW includes the index of the HeNB into the PWS Restart Indication and transmits the PWS Restart Indication to the MME. The MME stores the index of the HeNB. After receiving a warning request from the CBC, the MME includes the stored index of the HeNB into the warning request and transmits the warning request to the HeNB GW.

According to manner two, the HeNB or the HeNB GW includes the index of the HeNB into the PWS Restart Indication and transmits the PWS Restart Indication to the MME. The MME transmits the index of the HeNB to the CBC. The CBC includes the index of the HeNB into the warning request, and transmits the warning request to the MME. This method does not require the MME to parse and modify the PWS Restart Indication and the warning request.

Figure 3:
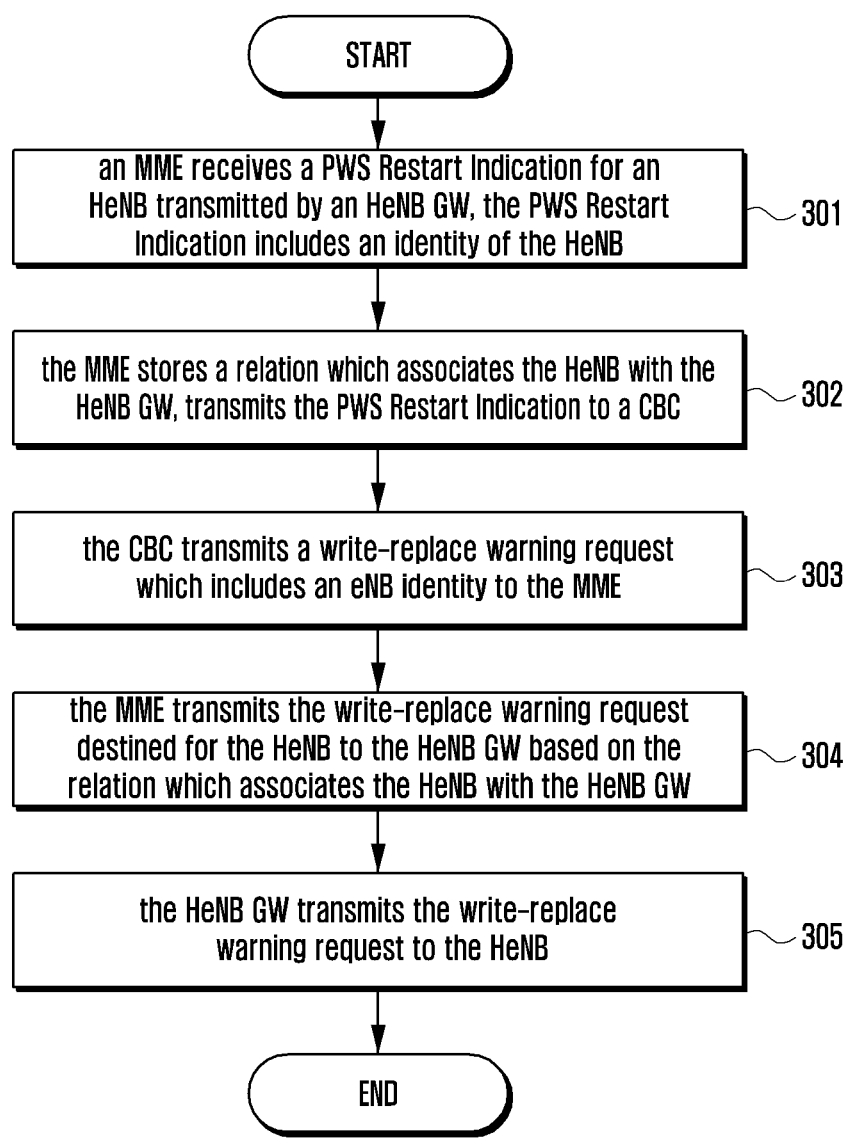
FIG. 3 is a flowchart illustrating a method of implementing fast recovery of PWSs according to an embodiment of the present disclosure.

FIG. 3 is a flowchart illustrating a method of implementing fast recovery of PWSs according to an embodiment of the present disclosure.

Referring to FIG. 3, at operation 301, an MME receives an HeNB PWS Restart Indication transmitted by an HeNB GW. The HeNB PWS Restart Indication includes an index of the HeNB (e.g., an identity of the HeNB or a TAI supported by the HeNB).

When the PWS Restart Indication includes an eNB identity, the eNB identity is the identity of the HeNB.

At operation 302, the MME establishes and stores a relation which associates the HeNB with the HeNB GW, and transmits the HeNB PWS Restart Indication to a CBC.

In an embodiment of the present disclosure, the MME may obtain the index of the HeNB by using the index of the HeNB or an eNB identity Information Element (IE) (which is set to be the identity of the HeNB) in the PWS Restart Indication. The MME may obtain the index of the HeNB GW by using an eNB identity (which is the identity of the HeNB GW) or a TAI supported by the HeNB GW during a process of establishing an S1 interface connection between the MME and the HeNB GW. The MME establishes and stores the relation which associates the HeNB with the HeNB GW by using the index of the HeNB and the index of the HeNB GW.

At operation 303, after receiving the PWS Restart Indication, the CBC decides to recover warning messages destined for the restarting cell or base station. The CBC may transmit a warning request to the MME. The warning request may include the eNB identity or the TAI in the received PWS Restart Indication to instruct the MME to transmit the warning request to the specified base station.

At operation 304, the MME receives the write-replace warning request from the CBC. The warning request may include an eNB identity or a TAI. The MME transmits the warning request destined for the HeNB to the HeNB GW based on the relation which associates the HeNB with the HeNB GW.

The procedure in operation 305 is the same as operation 206, which will not be further described herein.

Figure 4:
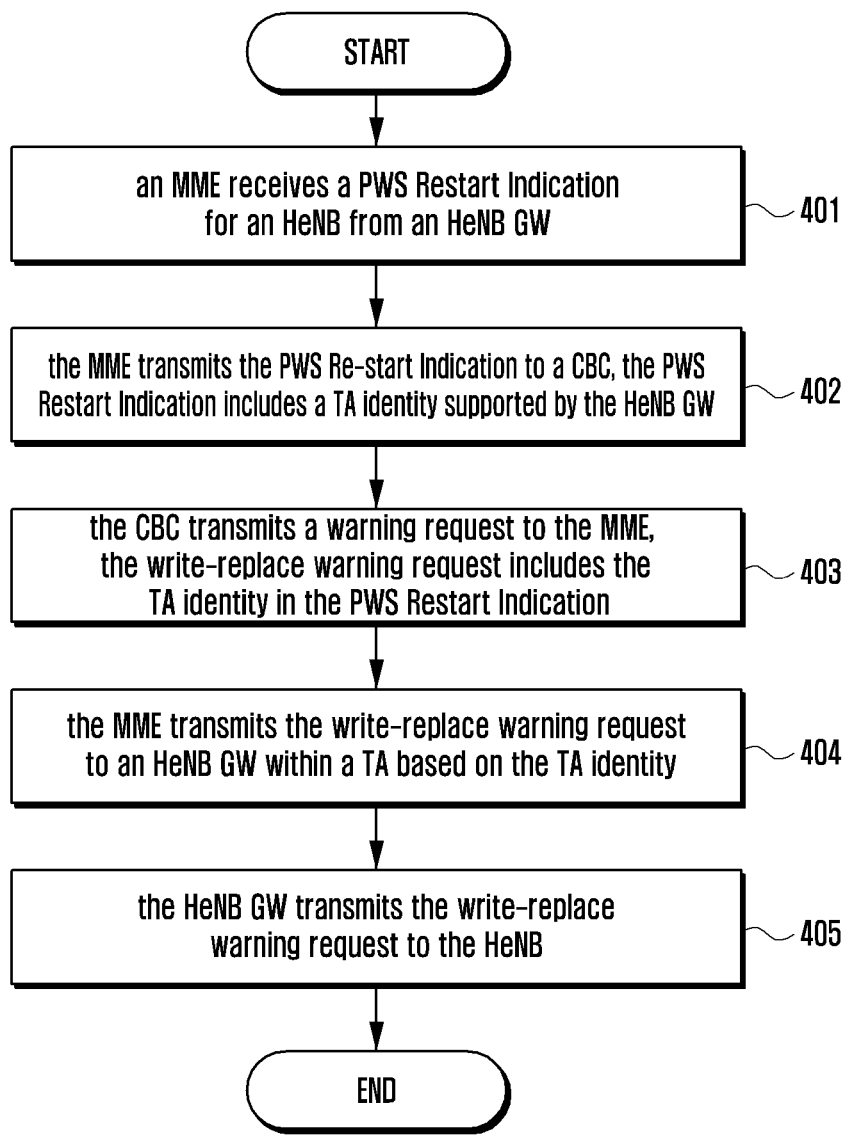
FIG. 4 is a flowchart illustrating a method of implementing fast recovery of PWSs according to an embodiment of the present disclosure.

FIG. 4 is a flowchart illustrating a method of implementing fast recovery of PWSs according to an embodiment of the present disclosure.

Referring to FIG. 4, at operation 401, an MME receives an HeNB PWS Restart Indication from an HeNB GW.

The MME may forward the PWS Restart Indication by using the following manners.

The MME adds a TAI supported by the HeNB GW into the PWS Restart Indication, and transmits the PWS Restart Indication to a CBC. In an embodiment of the present disclosure, the MME may obtain the TAI supported by the HeNB GW by using a TAI supported by an eNB used during a process of establishing an S1 interface between the MME and the HeNB GW.

At operation 402, the MME transmits the PWS Restart Indication to the CBC. The PWS Restart Indication may include the TAI supported by the HeNB GW. The TAI is used by the MME for transmitting the warning message to the HeNB GW connected by the HeNB when the CBC is recovering warning messages for the restarting HeNB cell or restarting HeNB.

At operation 403, after receiving the PWS Restart Indication, the CBC decides to recover warning messages destined for the restarting cell or base station. The CBC may transmit a warning request to the MME. The warning request may include the TAI in the received PWS Restart Indication to instruct the MME to transmit the warning request to the specified base station.

At operation 404, the MME receives a write-replace warning request transmitted by the CBC. The warning request includes the TAI. The MME transmits the warning request to the HeNB GW within the TA corresponding to the TAI.

The procedure in operation 405 is the same as operation 206, which will not be further described herein.

Figure 5:
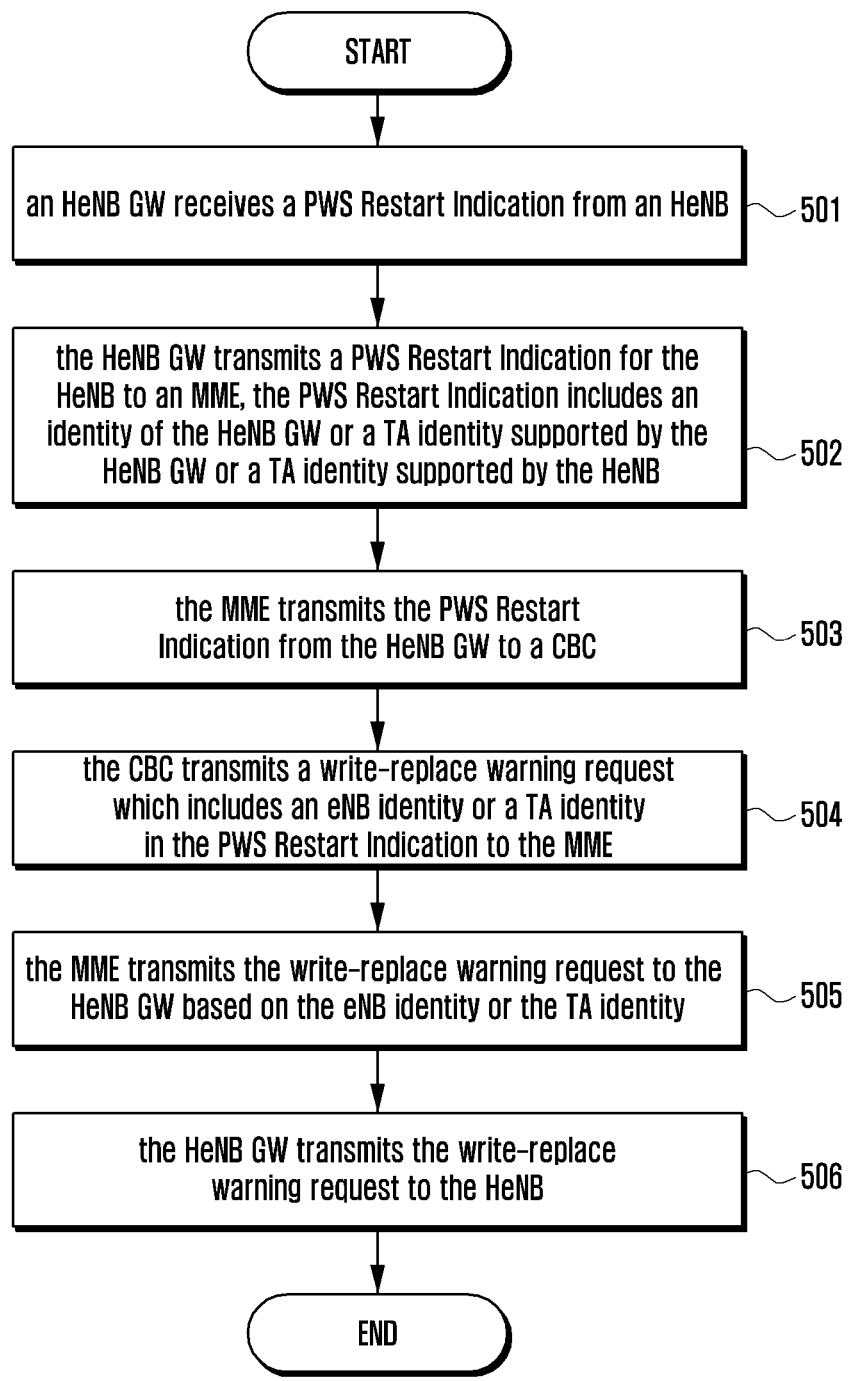
FIG. 5 is a flowchart illustrating a method of implementing fast recovery of PWSs according to an embodiment of the present disclosure.

FIG. 5 is a flowchart illustrating a method of implementing fast recovery of PWSs according to an embodiment of the present disclosure.

Referring to FIG. 5, at operation 501, an HeNB GW receives a PWS Restart Indication transmitted by an HeNB.

The HeNB GW may forward the PWS Restart Indication by using at least one of the following methods.

The HeNB GW adds an identity of the HeNB GW into the PWS Restart Indication, and transmits the PWS Restart Indication to an MME.

The HeNB GW replaces an identity of the HeNB in the PWS Restart Indication by an identity of the HeNB GW, and transmits the PWS Restart Indication to an MME.

The HeNB GW adds a TAI supported by the HeNB GW or a TAI supported by the HeNB into the PWS Restart Indication, and transmits the PWS Restart Indication to the MME.

At operation 502, the HeNB GW transmits an HeNB PWS Restart Indication to the MME. The HeNB PWS Restart Indication includes the identity of the HeNB GW or the TAI supported by the HeNB GW or the TAI supported by the HeNB. When the HeNB PWS Restart Indication includes an eNB identity, the eNB identity is set to be the identity of the HeNB GW.

At operation 503, the MME transmits the HeNB PWS Restart Indication from the HeNB GW to a CBC.

At operation 504, after receiving the HeNB PWS Restart Indication, the CBC decides to recover warning messages destined for the restarting cell or base station. The CBC may transmit a warning request to the MME. The warning request may include the eNB identity or the TAI in the received HeNB PWS Restart Indication to instruct the MME to transmit the warning request to the specified base station. When the HeNB accesses the MME via the HeNB GW, the eNB identity is the identity of the HeNB GW connected to the HeNB.

At operation 505, the MME receives a write-replace warning request transmitted by the CBC. The MME transmits the warning request to the HeNB GW based on the eNB identity or the TAI in the warning request.

The procedure in operation 506 is the same as operation 206, which will not be further described herein.

Figure 6:
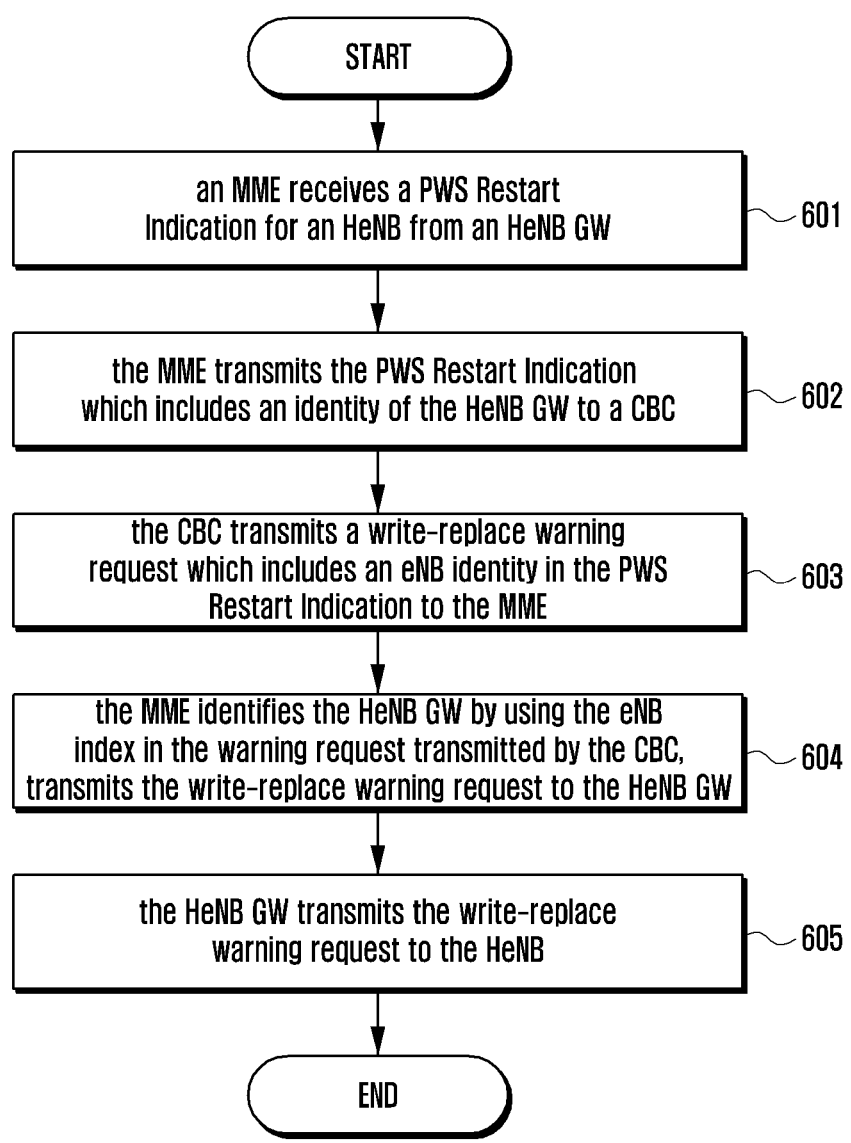
FIG. 6 is a flowchart illustrating a method of implementing fast recovery of PWSs according to an embodiment of the present disclosure.

FIG. 6 is a flowchart illustrating a method of implementing fast recovery of PWSs according to an embodiment of the present disclosure.

Referring to FIG. 6, at operation 601, an MME receives an HeNB PWS Restart Indication transmitted by an HeNB GW. The HeNB PWS Restart Indication may provide PWS information of some or all cells of an HeNB that are available for reloading from the CBC or indicating PWS service in some or all cells of the eNB is restarted.

The MME may forward the HeNB PWS Restart Indication by using at least one of the following methods.

The MME adds an identity of the HeNB GW into the HeNB PWS Restart Indication, and transmits the HeNB PWS Restart Indication to a CBC.

The MME replaces an identity of the HeNB in the HeNB PWS Restart Indication with an identity of the HeNB GW, and transmits the HeNB PWS Restart Indication to the CBC.

At operation 602, the MME transmits the HeNB PWS Restart Indication to the CBC. The HeNB PWS Restart Indication may include an identity of the HeNB GW. The identity of the HeNB GW is used by the CBC for instructing the MME to transmit the warning message to the HeNB GW connected by the HeNB when the CBC is recovering warning messages for the restarting HeNB cell or restarting HeNB. When the HeNB PWS Restart Indication includes an eNB identity, the eNB identity is set to be the identity of the HeNB GW.

At operation 603, after receiving the HeNB PWS Restart Indication, the CBC decides to recover warning messages destined for the restarting cell or base station. The CBC may transmit a warning request to the MME. The warning request may include an eNB identity in the received HeNB PWS Restart Indication to instruct the MME to transmit the warning request to the specified base station. When the HeNB accesses the MME via the HeNB GW, the eNB identity is the identity of the HeNB GW connected by the HeNB.

At operation 604, the MME receives a write-replace warning request transmitted by the CBC, identifies a HeNB GW by using the eNB identity in the warning request, and transmits the warning request to the HeNB GW identified.

The procedure in operation 605 is the same as that in operation 205, and will not be further described.

Figure 7:
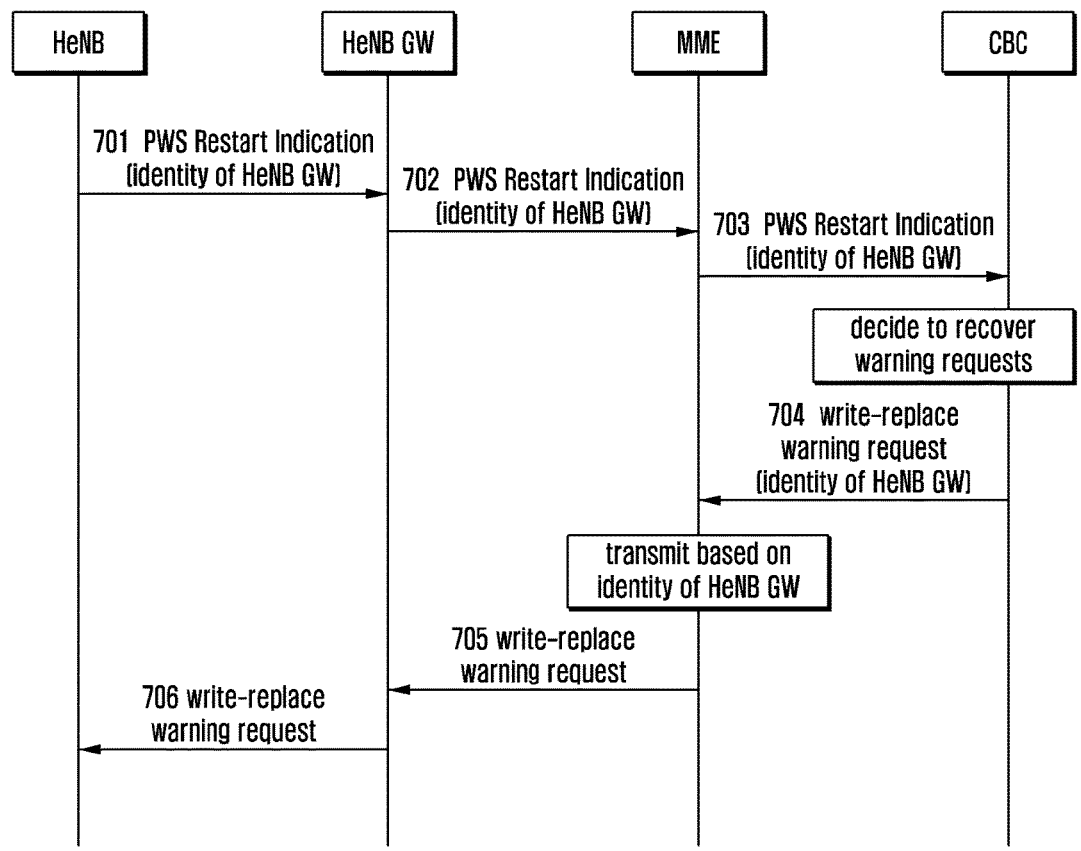
FIG. 7 is a schematic diagram illustrating a method of implementing fast recovery of PWSs according to an embodiment of the present disclosure.

FIG. 7 is a schematic diagram illustrating a method of implementing fast recovery of PWSs according to an embodiment of the present disclosure.

Referring to FIG. 7, when an HeNB cell or an HeNB restarts, the HeNB transmits a PWS Restart Indication which includes an identity of an HeNB GW. A CBC may use the identity of the HeNB GW to instruct an MME to transmit a warning message to the HeNB GW connected by the HeNB when the CBC is recovering warning messages destined for the HeNB cell or the HeNB that is restarting. The method may include the following procedures.

At operation 701, an HeNB transmits a PWS Restart Indication to an HeNB GW. The PWS Restart Indication includes an identity of the HeNB GW.

The HeNB may deliver the identity of the HeNB GW using two methods.

The PWS Restart Indication may include an IE (Information Element) for the identity of the HeNB GW.

Alternatively, the PWS Restart Indication may include an IE of eNB identity, and the HeNB sets the eNB identity to be the identity of the HeNB GW.

At operation 702, the HeNB GW transmits a second PWS Restart Indication to the MME. The second PWS Restart Indication has the same contents with the PWS Restart Indication in operation 701.

At operation 703, the MME transmits a third PWS Restart Indication to a CBC. The third PWS Restart Indication may include the identity of the HeNB GW.

At operation 704, the CBC decides to recover warning messages for the restarting HeNB cell or the restarting HeNB, and transmits a warning request (e.g., a write-replace warning request) to the MME. The warning request may include the identity of the HeNB GW.

At operation 705, the MME receives the warning request transmitted by the CBC, and transmits the warning request to the HeNB GW based on the identity of the HeNB GW in the warning request.

At operation 706, after receiving the warning request, the HeNB GW transmits the warning request to the HeNB.

The HeNB GW may transmit the warning request to the HeNB through three manners.

The warning request includes the identity of the HeNB, and the HeNB GW transmits the warning request to the HeNB by using the identity of the HeNB specified.

Alternatively, the HeNB GW may identify the HeNB according to a warning area in the warning request, and transmits the warning request to an HeNB in the warning area.

Alternatively, after receiving the warning request, the HeNB GW may transmit the warning request to all of HeNBs connected to the HeNB GW, and each of the HeNBs may decide whether to accept the warning request according to whether the HeNB belongs to the warning area.

Figure 8:
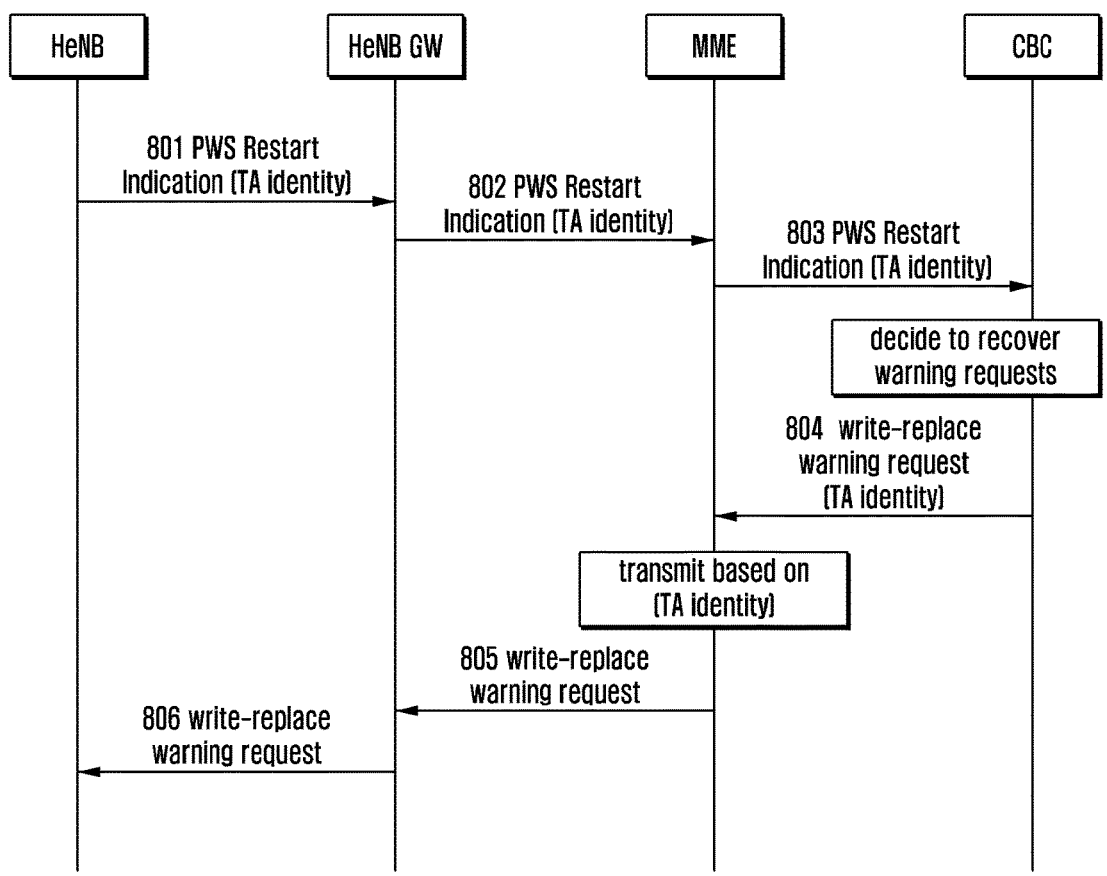
FIG. 8 is a schematic diagram illustrating a method of implementing fast recovery of PWSs according to an embodiment of the present disclosure.

FIG. 8 is a schematic diagram illustrating a method of implementing fast recovery of PWSs according to an embodiment of the present disclosure.

Referring to FIG. 8, when an HeNB cell or an HeNB restarts, the HeNB transmits a PWS Restart Indication which includes a TAI supported by the HeNB or of an HeNB GW. The identity of the HeNB GW may be similar to that described in operation 402. A CBC may use the TAI to instruct an MME to transmit a warning message to the HeNB GW connected to the HeNB when the CBC is recovering warning messages for the HeNB cell or the HeNB that is restarting. The method may include the following procedures.

At operation 801, an HeNB transmits a PWS Restart Indication to an HeNB GW. The PWS Restart Indication includes a TAI supported by the HeNB.

At operation 802, the HeNB GW transmits a second PWS Restart Indication to an MME. The second PWS Restart Indication includes the TAI.

At operation 803, the MME transmits a third PWS Restart Indication to a CBC. The third PWS Restart Indication includes the TAI.

At operation 804, the CBC decides to recover warning messages for the restarting HeNB cell or the restarting HeNB, and transmits a warning request (e.g., a write-replace warning request) to the MME. The warning request may include the TAI.

At operation 805, the MME receives the warning request transmitted by the CBC, and transmits the warning request to the HeNB GW based on the TAI in the warning request.

The procedure in operation 806 is the same as operation 706, which will not be further described herein.

Figure 9:
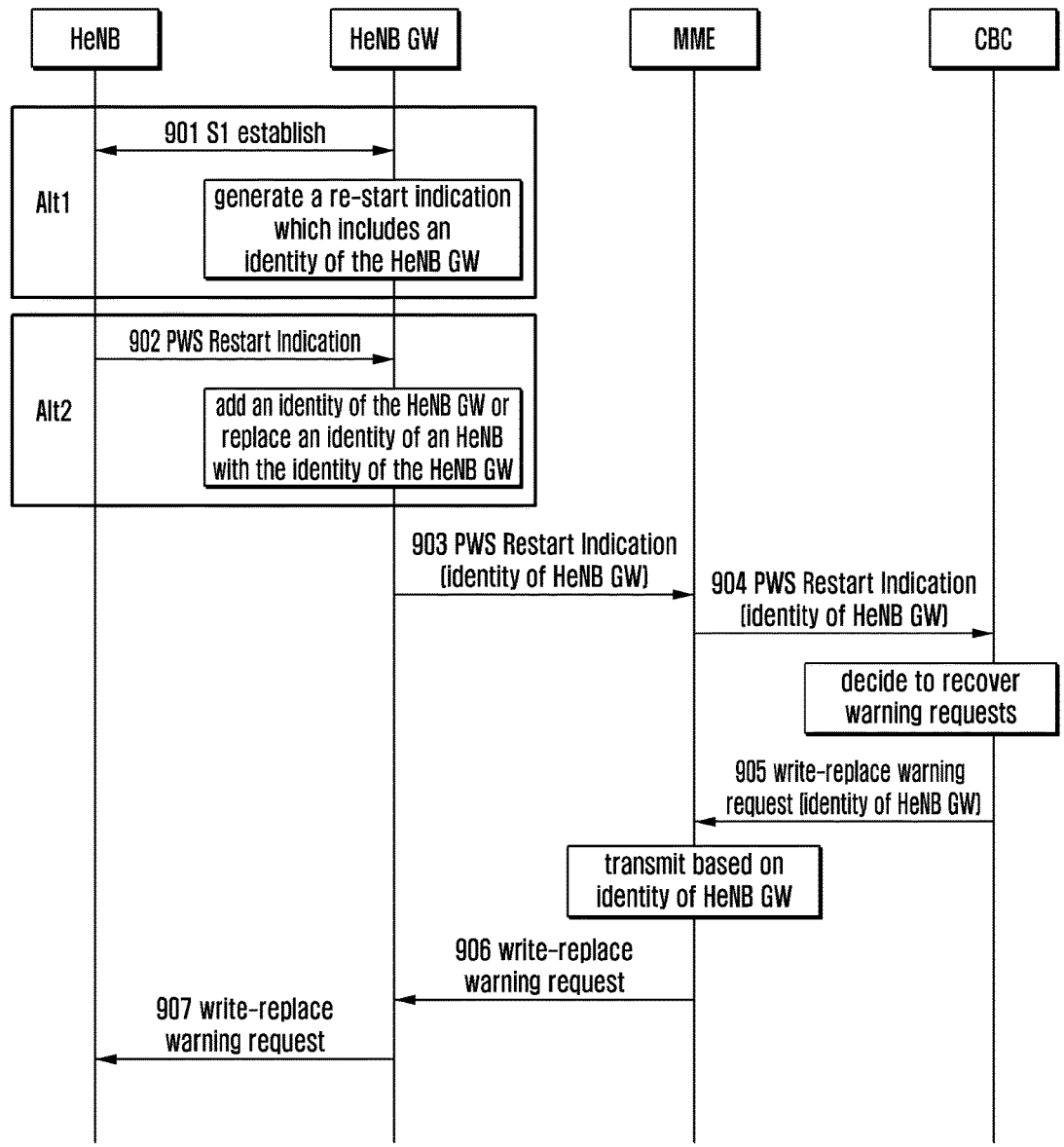
FIG. 9 is a schematic diagram illustrating a method of implementing fast recovery of PWSs according to an embodiment of the present disclosure.

FIG. 9 is a schematic diagram illustrating a method of implementing fast recovery of PWSs according to an embodiment of the present disclosure.

Referring to FIG. 9, if an HeNB cell or an HeNB restarts, when an HeNB GW transmits a PWS Restart Indication of the HeNB, the HeNB GW may add an identity of the HeNB GW into a PWS Restart Indication transmitted by the HeNB, or replace an identity of the HeNB in the PWS Restart Indication transmitted by the HeNB by the identity of the HeNB GW, or the HeNB may directly generate the HeNB PWS Restart Indication that includes the identity of the HeNB GW. The method may include the following procedures.

When an HeNB cell or an HeNB restarts, two mechanisms, described respectively in operations 901 and 902, may be adopted to trigger the HeNB GW to transmit an HeNB PWS Restart Indication to an MME.

At operation 901, an HeNB restarts, the HeNB re-establishes an S1 interface with an HeNB GW. The HeNB GW generates a PWS Restart Indication for the HeNB. The PWS Restart Indication includes an identity of the HeNB GW.

At operation 902, an HeNB cell or an HeNB restarts, the HeNB transmits a PWS Restart Indication to an HeNB GW. The HeNB GW adds an identity of the HeNB GW into the PWS Restart Indication or replaces an identity of the HeNB in the PWS Restart Indication with the identity of the HeNB GW, and transmits the modified PWS Restart Indication to an MME.

The HeNB GW may deliver the identity of the HeNB GW using two methods.

The PWS Restart Indication may include n IE for the identity of the HeNB GW.

Alternatively, the PWS Restart Indication may include an IE of eNB identity, and the HeNB GW sets the eNB identity to be the identity of the HeNB GW.

Procedures in operations 903 to 907 are the same as those in operations 702 to 706, and will not be further described.

Figure 10:
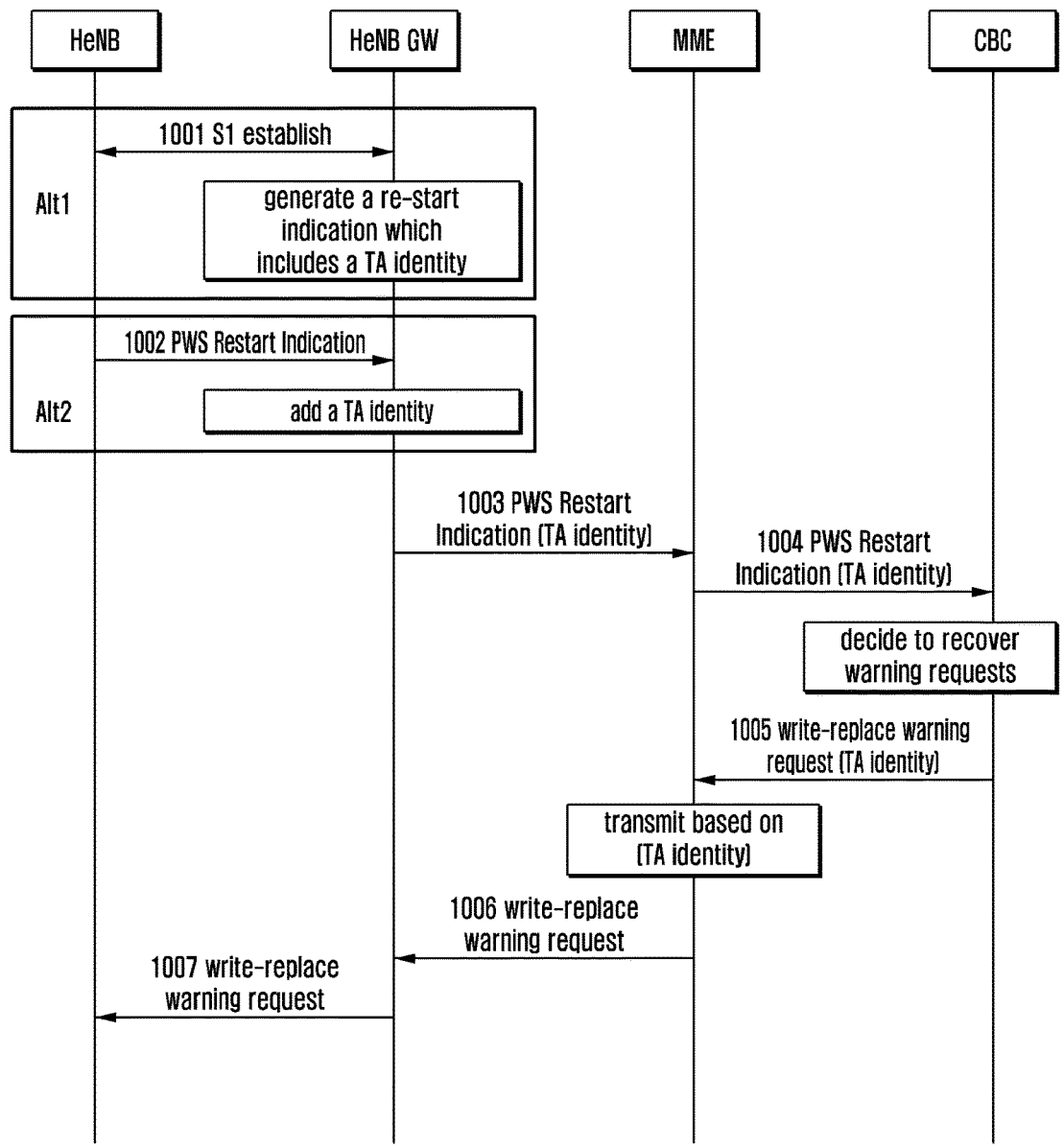
FIG. 10 is a schematic diagram illustrating a method of implementing fast recovery of PWSs according to an embodiment of the present disclosure.

FIG. 10 is a schematic diagram illustrating a method of implementing fast recovery of PWSs according to an embodiment of the present disclosure.

Referring to FIG. 10, when an HeNB cell or an HeNB restarts and the HeNB GW transmits an HeNB PWS Restart Indication, the HeNB GW may add a TAI supported by the HeNB or of the HeNB GW in a PWS Restart Indication transmitted by the HeNB, or directly generates the HeNB PWS Restart Indication that includes the TAI supported by the HeNB or of the HeNB GW. The TAI may be as described in operation 402. The method may include the following procedures.

When an HeNB cell or an HeNB restarts, two mechanisms, described respectively in operations 1001 and 1002, may be adopted to trigger the HeNB GW to transmit an HeNB PWS Restart Indication to an MME.

At operation 1001, an HeNB restarts, the HeNB re-establishes an S1 interface with an HeNB GW. The HeNB GW generates a PWS Restart Indication for the HeNB. The PWS Restart Indication includes a TAI supported by the HeNB GW or of the HeNB.

At operation 1002, an HeNB cell or an HeNB restarts, the HeNB transmits a PWS Restart Indication to an HeNB GW. The HeNB GW adds a TAI supported by the HeNB GW or of the HeNB into the PWS Restart Indication, and transmits the modified PWS Restart Indication to an MME.

Procedures in operations 1003 to 1007 are the same as those in operations 802 to 806, and will not be further described.

Figure 11:
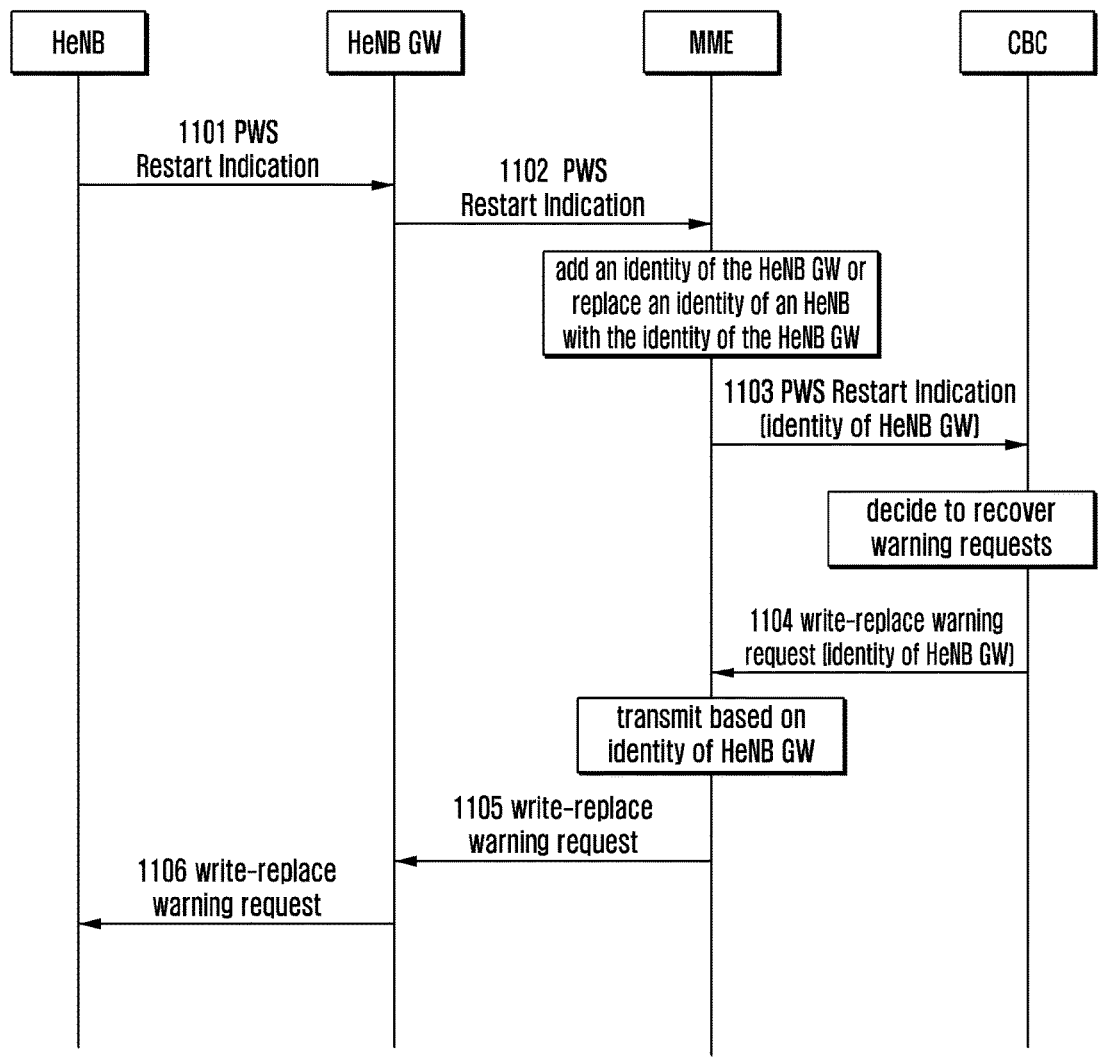
FIG. 11 is a schematic diagram illustrating a method of implementing fast recovery of PWSs according to an embodiment of the present disclosure.

FIG. 11 is a schematic diagram illustrating a method of implementing fast recovery of PWSs according to an embodiment of the present disclosure.

Referring to FIG. 11, after receiving a PWS Restart Indication for a restarting HeNB cell or a restarting HeNB, an MME adds an identity of an HeNB GW into the PWS Restart Indication or replaces an identity of the HeNB in the PWS Restart Indication with an identity of an HeNB GW, and transmits the modified PWS Restart Indication to a CBC. The method may include the following procedures.

At operation 1101, an HeNB transmits a PWS Restart Indication to an HeNB GW.

At operation 1102, the HeNB GW transmits an HeNB PWS Restart Indication to the MME. The MME adds an identity of the HeNB GW into the received HeNB PWS Restart Indication, or replaces an identity of the HeNB in the received HeNB PWS Restart Indication with an identity of the HeNB GW, and transmits the modified HeNB PWS Restart Indication to the CBC.

The MME may deliver the identity of the HeNB GW to the CBC using two methods.

The HeNB PWS Restart Indication may include an IE for the identity of the HeNB GW.

Alternatively, the HeNB PWS Restart Indication may include an IE of an eNB identity, and the HeNB sets the eNB identity to be the identity of the HeNB GW.

Procedures in operations 1103 to 1106 are the same as those in operations 703 to 706, and will not be further described.

Figure 12:
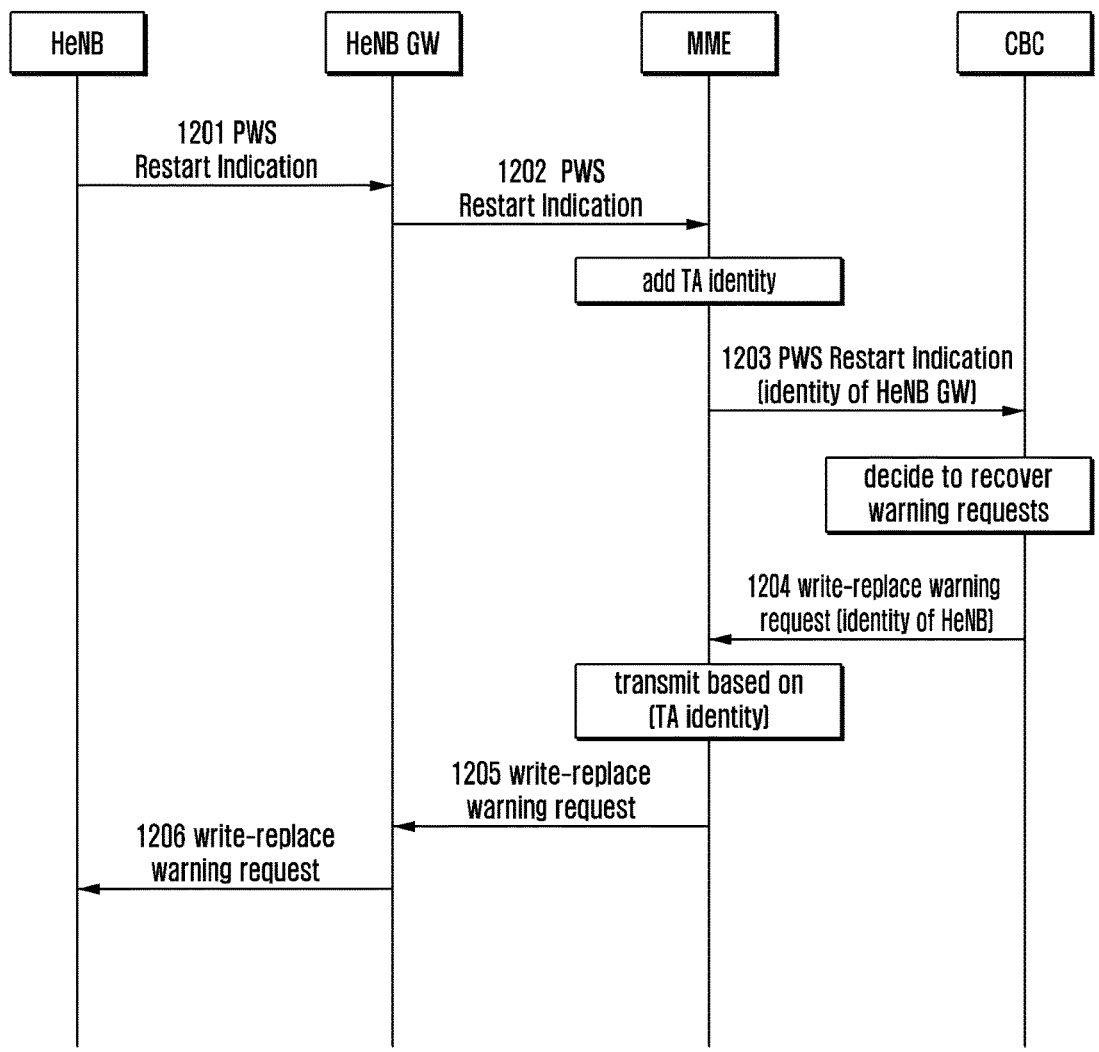
FIG. 12 is a schematic diagram illustrating a method of implementing fast recovery of PWSs according to an embodiment of the present disclosure.

FIG. 12 is a schematic diagram illustrating a method of implementing fast recovery of PWSs according to an embodiment of the present disclosure.

Referring to FIG. 12, after receiving a PWS Restart Indication for an HeNB cell or an HeNB transmitted by the HeNB, an MME adds a TAI supported by an HeNB GW into the received PWS Restart Indication, and transmits the modified PWS Restart Indication to a CBC. The TAI may be as described in operation 402. The method may include the following procedures.

At operation 1201, an HeNB transmits a PWS Restart Indication to an HeNB GW.

At operation 1202, the HeNB GW transmits an HeNB PWS Restart Indication to the MME. The MME adds the TAI supported by the HeNB GW into the received HeNB PWS Restart Indication, and transmits the HeNB PWS Restart Indication to a CBC.

Procedures in operations 1203 to 1206 are the same as those in operations 803 to 806, and will not be further described.

Figure 13:
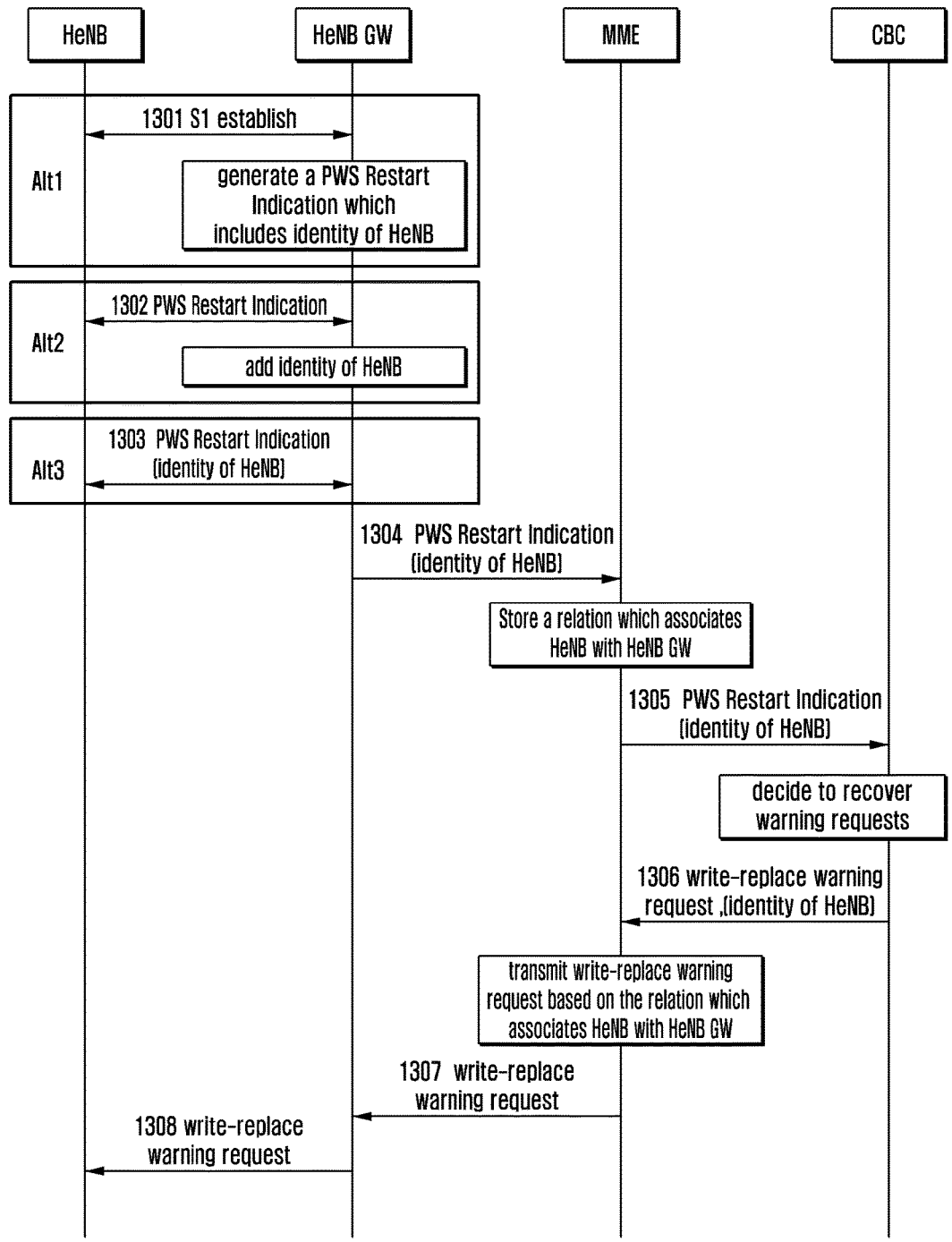
FIG. 13 is a schematic diagram illustrating a method of implementing fast recovery of PWSs according to an embodiment of the present disclosure.

FIG. 13 is a schematic diagram illustrating a method of implementing fast recovery of PWSs according to an embodiment of the present disclosure.

Referring to FIG. 13, after receiving a PWS Restart Indication for an HeNB cell or an HeNB transmitted by the HeNB, an MME stores a relation which associates the HeNB with an HeNB GW, and transmits a warning request destined for the HeNB to the HeNB GW based on the relation. The relation may be as described in operation 302. The method may include the following procedures.

When an HeNB cell or an HeNB restarts, three mechanisms, described respectively in operations 1301, 1302 and 1303, may be adopted to trigger the HeNB GW to transmit an HeNB PWS Restart Indication to an MME.

At operation 1301, an HeNB restarts, the HeNB re-establishes an S1 interface with an HeNB GW. The HeNB GW generates a PWS Restart Indication for the HeNB. The PWS Restart Indication includes an identity of the HeNB.

At operation 1302, an HeNB cell or an HeNB restarts, the HeNB transmits a PWS Restart Indication to an HeNB GW. The HeNB GW adds an identity of the HeNB into the PWS Restart Indication, and transmits the modified PWS Restart Indication to an MME.

At operation 1303, an HeNB cell or an HeNB restarts, the HeNB transmits a PWS Restart Indication to an HeNB GW. The PWS Restart Indication includes an identity of the HeNB. The HeNB GW directly forwards the PWS Restart Indication from the HeNB to an MME.

At operation 1304, the HeNB GW transmits the PWS Restart Indication to the MME. The PWS Restart Indication includes the identity of the HeNB.

At operation 1305, the MME receives a PWS Restart Indication for the HeNB from the HeNB GW, stores a relation which associates the HeNB with the HeNB GW, and transmits the PWS Restart Indication from the HeNB to a CBC.

At operation 1306, the CBC decides to recover warning messages for the restarting HeNB cell or the restarting HeNB after receiving the PWS Restart Indication for the HeNB, and transmits a warning request (e.g., a write-replace warning request) to the MME. The warning request includes the identity of the HeNB.

At operation 1307, the MME receives the write-replace warning request transmitted by the CBC, and transmits the write-replace warning request to the HeNB GW based on the relation which associates the HeNB GW with the HeNB identified by the identity of the HeNB in the write-replace warning request.

The procedure in operation 1308 is the same as operation 706, which will not be further described herein.

It can be seen from the above technical mechanism that the method is applicable to situations where a core network transmits warning requests to a specified base station, and particularly applicable to a situation where base stations access the core network via gateways. The various embodiments of the present disclosure provide multiple solutions for routing downlink signaling of warning messages that can satisfy demands of communications services designed for public security purposes.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a mobility management entity (MME) for implementing recovery of a public warning system (PWS), the method comprising:
    receiving a first PWS restart indication message including an identity of a home evolved nodeB (HeNB) gateway (GW) from the HeNB GW; and
    transmitting the first PWS restart indication message received from the HeNB GW to a cell broadcast center (CBC),
    wherein an identity of an HeNB in a second PWS restart indication message transmitted from the HeNB is replaced with the identity of the HeNB GW by the HeNB GW.

2. The method of claim 1, wherein a S1 interface between the HeNB GW with the HeNB is established before the second PWS restart indication message is transmitted from the HeNB.

3. The method of claim 1, further comprising:
    receiving a warning request message including the identity of the HeNB GW included in the first PWS restart indication message from the CBC; and
    forwarding the warning request message to the HeNB GW.

4. The method of claim 1, wherein the first and the second PWS restart indication message including a tracking area identity associated with a restarted cell.

5. A method by a home evolved nodeB (HeNB) gateway (GW) for implementing recovery of a public warning system (PWS), the method comprising:
    replacing an identity of an HeNB in a first PWS restart indication message with an identity of the HeNB GW; and
    transmitting, to a mobility management entity (MME), a second PWS restart indication message including the identity of the HeNB GW,
    wherein the first PWS restart indication message is transmitted from the HeNB.

6. The method of claim 5, further comprising:
    establishing a S1 interface with the HeNB before the first PWS restart indication message is transmitted from the HeNB.

7. The method of claim 5, further comprising:
    receiving a warning request message from the MME.

8. The method of claim 5, wherein the first and the second PWS restart indication message includes a tracking area identity associated with a restarted cell.

9. A mobility management entity (MME) for implementing recovery of a public warning system (PWS), the MME comprising:
    a transceiver configured to transmit and receive signals; and
    at least one processor configured to:
        receive a first PWS restart indication message including an identity of a home evolved nodeB (HeNB) gateway (GW) from the HeNB GW, and
        transmit the first PWS restart indication message received from the HeNB GW to a cell broadcast center (CBC),
    wherein an identity of an HeNB in a second PWS restart indication message transmitted from the HeNB is replaced with the identity of the HeNB GW by the the HeNB GW.

10. The MME of claim 9, wherein a S1 interface between the HeNB GW with the HeNB is established before the second PWS restart indication message is transmitted from the HeNB.

11. The MME of claim 9, wherein the at least one processor is further configured to:
    receive a warning request message including the identity of the HeNB GW included in the first PWS restart indication message from the CBC, and
    forward the warning request message to the HeNB GW.

12. The MME of claim 9, wherein the first and the second PWS restart indication message including a tracking area identity associated with a restarted cell.

13. A home evolved nodeB (HeNB) gateway (GW) for implementing recovery of a public warning system (PWS), the HeNB GW comprising:
    a transceiver configured to transmit and receive signals; and
    at least one processor configured to:
        replace an identity of an HeNB in a first PWS restart indication message with an identity of the HeNB GW, and
        transmit, to a mobility management entity (MME), a second PWS restart indication message including the identity of the HeNB GW,
    wherein the first PWS restart indication message is transmitted from the HeNB.

14. The HeNB GW of claim 13, wherein the at least one processor is further configured to establish a S1 interface with the HeNB before the first PWS restart indication message is transmitted from the HeNB.

15. The HeNB GW of claim 13, wherein the at least one processor is further configured to receive a warning request message from the MME.

16. The HeNB GW of claim 13, wherein the first and the second PWS restart indication message includes a tracking area identity associated with a restarted cell.

* * * * *